(12) United States Patent
Bowen

(10) Patent No.: US 7,044,880 B2
(45) Date of Patent: May 16, 2006

(54) TORQUE DISTRIBUTING DIFFERENTIAL ASSEMBLY

(75) Inventor: Thomas C. Bowen, Rochester Hills, MI (US)

(73) Assignee: Magna Powertrain, Inc., Troy, MI (US)

( * ) Notice: Subject to any disclaimer, the term of this patent is extended or adjusted under 35 U.S.C. 154(b) by 194 days.

(21) Appl. No.: 10/849,994

(22) Filed: May 20, 2004

(65) Prior Publication Data

US 2005/0261099 A1 Nov. 24, 2005

(51) Int. Cl.
*F16H 37/08* (2006.01)

(52) U.S. Cl. ............... 475/205; 475/198; 475/201; 475/204; 475/288; 475/18; 475/19; 180/248; 180/249

(58) Field of Classification Search ............ 475/18, 475/19, 198, 201, 204, 205, 288; 180/248, 180/249
See application file for complete search history.

(56) References Cited

U.S. PATENT DOCUMENTS

| | | | |
|---|---|---|---|
| 672,620 A | 6/1901 | Buffum | |
| 856,703 A | 6/1907 | Iversen | |
| 1,382,289 A | 6/1921 | Janicki | |
| 1,954,686 A | 4/1934 | Stickney | |
| 1,964,956 A | 7/1934 | Lincoln | |
| 2,466,683 A | 4/1949 | Buckendale | |
| 3,690,426 A | 9/1972 | Weisgerber | |
| 4,417,642 A * | 11/1983 | Suzuki et al. | 180/249 |
| 4,691,593 A | 9/1987 | Mueller | |
| 4,757,728 A | 7/1988 | Pitsch | |
| 4,763,747 A | 8/1988 | Muller | |
| 4,779,699 A * | 10/1988 | Hatano | 180/248 |
| 4,967,861 A * | 11/1990 | Oyama et al. | 180/233 |
| 5,071,396 A * | 12/1991 | Kobayashi | 475/249 |
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 6,120,407 A | 9/2000 | Mimura | |
| 6,378,677 B1 | 4/2002 | Kuroda et al. | |
| 6,394,246 B1 | 5/2002 | Gassmann et al. | |
| 6,520,880 B1 | 2/2003 | Fukushima et al. | |
| 6,533,090 B1 | 3/2003 | Osborn et al. | |
| 6,616,566 B1 | 9/2003 | Gorlich | |
| 6,645,108 B1 | 11/2003 | Gradu | |

\* cited by examiner

FOREIGN PATENT DOCUMENTS

WO    WO 02/09966 A1    2/2002

*Primary Examiner*—Charles A. Marmor
*Assistant Examiner*—David D. Le
(74) *Attorney, Agent, or Firm*—Harness, Dickey & Pierce P.L.C.

(57) ABSTRACT

A drive axle assembly includes first and second axleshafts connected to a pair of wheels and a drive mechanism operable to selectively couple a driven input shaft to one or both of the axleshafts. The drive mechanism includes a differential assembly, a planetary gear assembly operably disposed between the differential assembly and the first axleshafts and first and second mode clutches. The first mode clutch is operable with the planetary gear assembly to increase the rotary speed of the first axleshaft which, in turn, causes a corresponding decrease in the rotary speed of the second axleshaft. The second mode clutch is operable with the planetary gear assembly to decrease the rotary speed of the first axleshaft so as to cause an increase in the rotary speed of the second axleshaft. A control system controls actuation of both mode clutches.

10 Claims, 7 Drawing Sheets

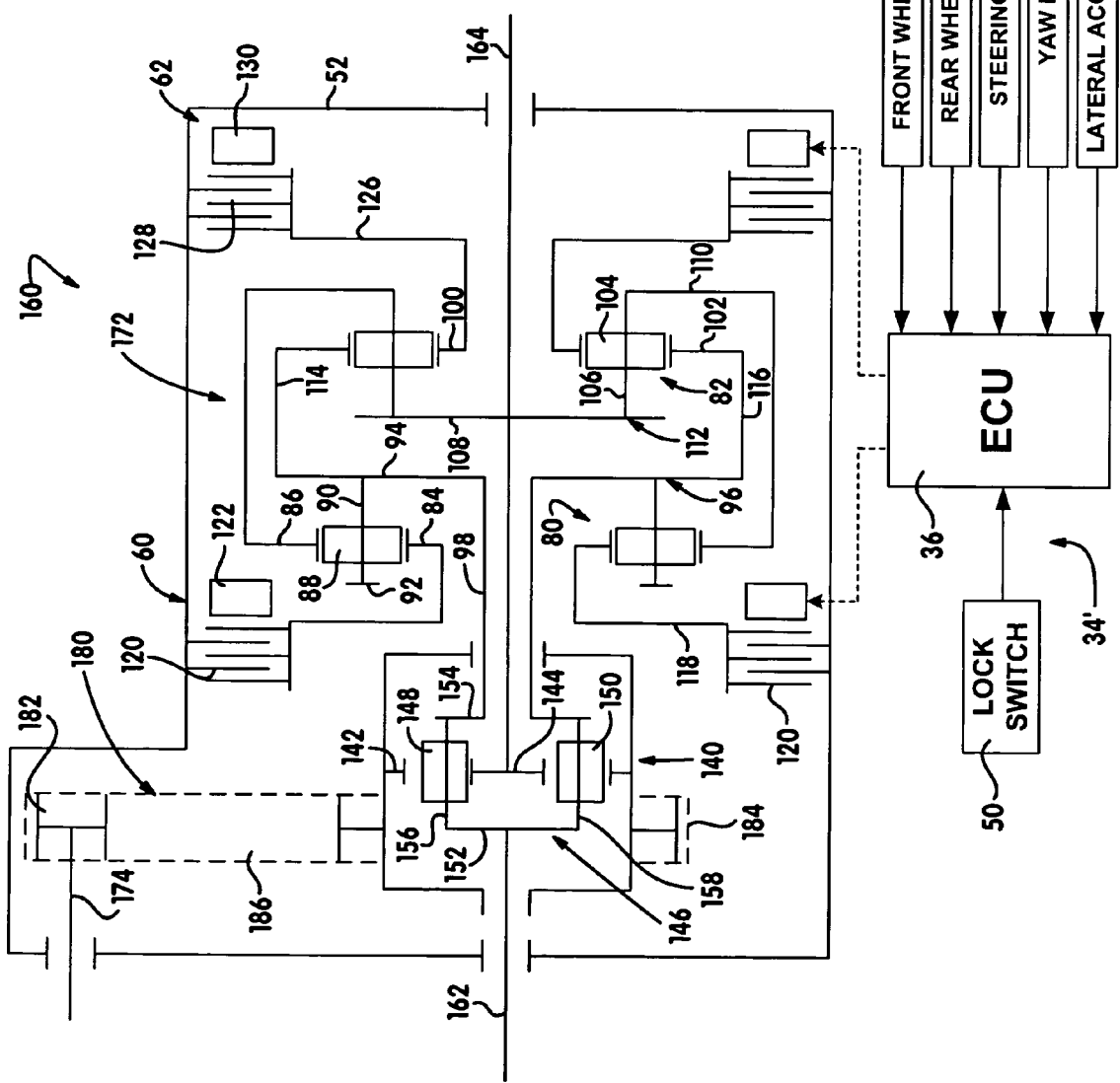

TORQUE DISTRIBUTING DIFFERENTIAL ASSEMBLY

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw control system.

To achieve this objective, the drive axle assembly of the present invention includes first and second axleshafts connected to a pair of wheels and a drive mechanism that is operable to selectively couple a driven input shaft to one or both of the axleshafts. The drive mechanism includes a differential assembly, a planetary gear assembly, and first and second mode clutches. The planetary gear assembly is operably disposed between the differential assembly and the first axleshafts. The first mode clutch is operable in association with the planetary gear assembly to increase the rotary speed of the first axleshaft which, in turn, causes the differential assembly to decrease the rotary speed of the second axleshaft. In contrast, the second mode clutch is operable in association with the planetary gear assembly to decrease the rotary speed of the first axleshaft so as to cause the differential assembly to increase the rotary speed of the second axleshaft. Accordingly, selective control over actuation of one or both of the first and second mode clutches provides adaptive control of the speed differentiation and the torque transferred between the first and second axleshafts. A control system including and ECU and sensors are provided to control actuation of both mode clutches.

Pursuant to an alternative objection, the drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein:

FIG. 7 is a schematic drawing of the transfer unit shown in FIG. 6.

DETAILED DESCRIPTION OF THE PREFERRED EMBODIMENTS

Figure 1:
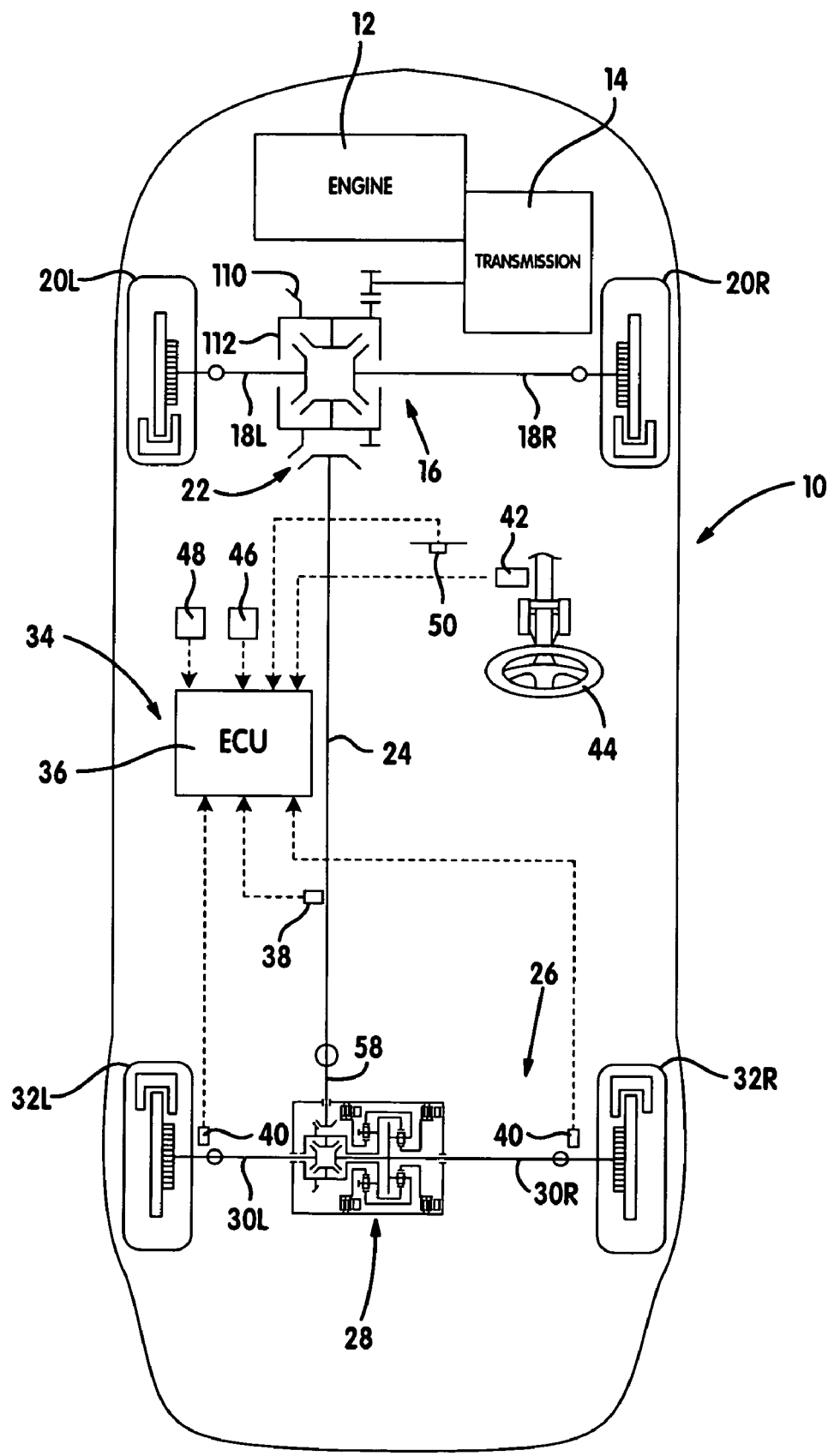
FIG. 1 is a diagrammatical illustration of an all-wheel drive motor vehicle equipped with the torque distributing drive axle and active yaw control system of the present invention.

Referring to FIG. 1, an all-wheel drive vehicle 10 includes an engine 12 horizontally mounted in a front portion of a vehicle body, a transmission 14 provided integrally with engine 12, a front differential 16 which connects transmission 14 to front axle shafts 18L and 18R and left and right front wheels 20L and 20R, a power transfer unit ("PTU") 22 which connects front differential 16 to a propshaft 24, and a rear axle assembly 26 having a drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propshaft 24, a pair of rear wheel speed sensors 40 are operable to detect the individual rear wheel speed values based rotation of left and right axle shafts 30L and 30R, and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of a pair of mode clutches associated with drive mechanism 28 by utilizing a control strategy that is based on input signals from the various sensors and lock switch 50.

Rear axle assembly 26 includes an axle housing 52 within which drive mechanism 28 is rotatably supported. In general, drive mechanism 28 includes an input shaft 54, a differential assembly 56, a planetary gear assembly 58, a first or "overdrive" mode clutch 60 and a second or "underdrive" mode clutch 62. As seen, input shaft 54 includes a pinion gear 64 that is in constant mesh with a hypoid ring gear 66. Ring gear 66 is fixed for rotation with a differential carrier 68 of differential assembly 56. Differential assembly 56 further includes a first or left output sidegear 70 that is fixed for rotation with left axleshaft 30L, a second or right output sidegear 72 that is fixed for rotation with right axleshaft 30R, and pinion gears 74 that are meshed with sidegears 70 and 72 and rotatably mounted on pinion shafts 76 secured to differential carrier 68.

Planetary gear assembly 58 includes a first gearset 80 and a second gearset 82. First gearset 80 includes a first sun gear 84, a first ring gear 86, and a set of first planet gears 88 meshed with first sun gear 84 and first ring gear 86. Each of first planet gears 88 is rotatably supported on a post 90 extending between first and second carrier rings 92 and 94, respectively, that in combination define a first planet carrier 96. A quill shaft 98 is disposed between right axleshaft 30R and first sun gear 84 and is shown to connect second carrier ring 94 to differential carrier 68. As such, first planet carrier 96 is the input member of first gearset 80 since it is commonly driven with differential carrier 68.

Second gearset 82 includes a second sun gear 100, a second ring gear 102, and a set of second planet gears 104 meshed therewith. Each of second planet gears 104 is rotatably supported on a post 106 extending between third and fourth carrier rings 108 and 110, respectively, that in combination define a second planet carrier 112. As seen, second ring gear 102 is coupled via a first drum 114 to second carrier ring 94 for common rotation with first planet carrier 96. In addition, third carrier ring 108 is fixed for rotation with right axleshaft 30R while fourth carrier ring 110 is fixed via a second drum 116 for common rotation with first ring gear 86.

Figure 2:
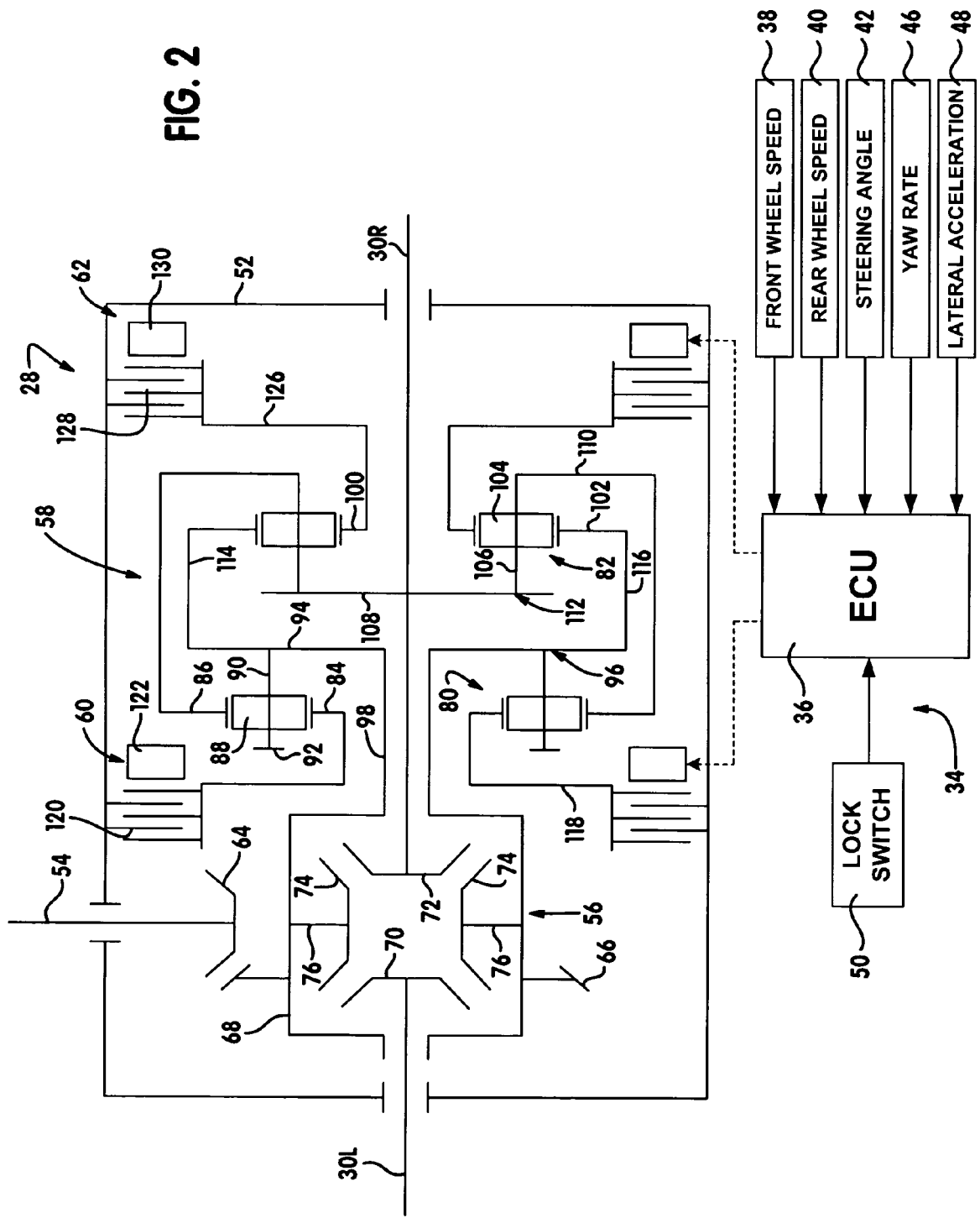
FIG. 2 is a schematic illustration of the drive axle assembly shown in FIG. 1 according to the present invention.
Figure 3:
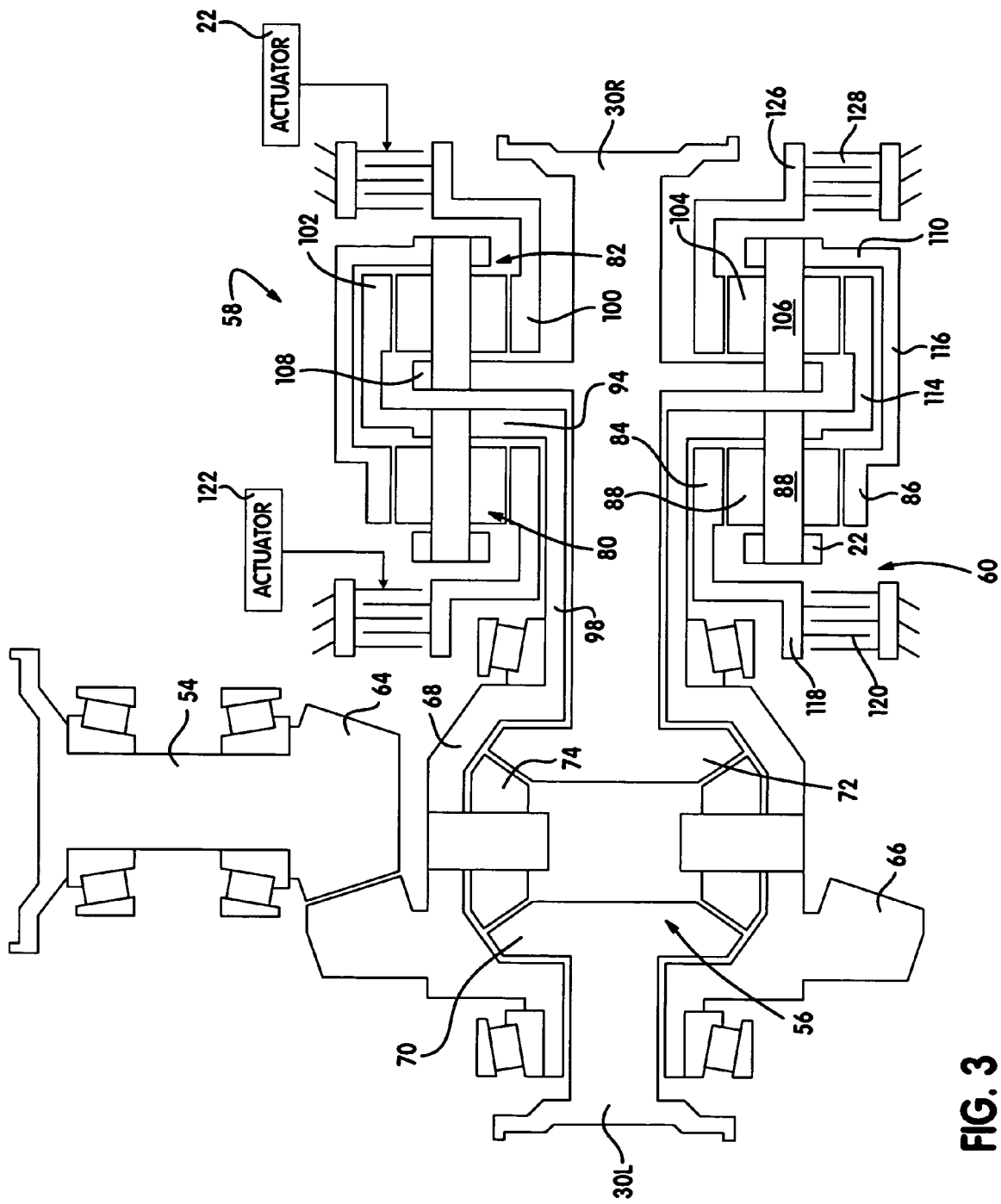
FIG. 3 is another illustration of the drive axle assembly shown in FIGS. 1 and 2.

With continued reference to FIGS. 2 and 3, first mode clutch 60 is shown to be operatively disposed between first sun gear 84 and axle housing 52 such that it is operable to selectively brake rotation of first sun gear 84. First mode clutch 60 includes a clutch hub 118 fixed for rotation with first sun gear 84, a multi-plate clutch pack 120 disposed between hub 116 and axle housing 52, and a power-operated clutch actuator 122. First mode clutch 60 is operable in a first or "released" mode so as to permit unrestricted rotation of first sun gear 84 relative to housing 52. In contrast, first mode clutch 60 is also operable in a second or "locked" mode for inhibiting rotation of first sun gear 84. With first sun gear 84 braked, the rotary speed of first ring gear 86 is increased which results in a corresponding increase in the rotary speed of right axleshaft 30R due to its direct connection with first ring gear 86 via second drum 116 and second planet carrier 112. Thus, right axleshaft 30R is overdriven is at a speed ratio established by the meshed gear components of first gearset 80. First mode clutch 60 is shifted between its released and locked modes via actuation of power-operated clutch actuator 122 in response to control signals from ECU 36. Specifically, first mode clutch 60 is operable in its released mode when clutch actuator 122 applies a predetermined minimum clutch engagement force on clutch pack 120 and is further operable in its locked mode when clutch actuator 122 applies a predetermined maximum clutch engagement force on clutch pack 120.

Second mode clutch 62 is shown to be operably arranged between second sun gear 100 and axle housing 52. Second mode clutch 62 includes a clutch hub 126 fixed for rotation with second sun gear 100, a clutch pack 128 disposed between hub 126 and housing 52, and a power-operated clutch actuator 130. Second mode clutch 62 is operable in a first or "released" mode to permit unrestricted rotation of second sun gear 100. In contrast, second mode clutch 62 is also operable in a second or "locked" mode for inhibiting rotation of second sun gear 100. With second sun gear 100 braked, the rotary speed of second planet carrier 112 is reduced which results in a corresponding speed reduction in right axleshaft 30R. Thus, right axleshaft 30R is underdriven at a speed ratio determined by the gear geometry of the meshed components of second gearset 82. Second mode clutch 62 is shifted between its released and locked modes via actuation of power-operated clutch actuator 130 in response to control signals from ECU 36. In particular, second mode clutch 62 operates in its released mode when clutch actuator 130 applies a predetermined minimum clutch engagement force on clutch pack 128 while it operates in its locked mode when clutch actuator 130 applies a predetermined maximum clutch engagement force on cutch pack 128.

Figure 4:
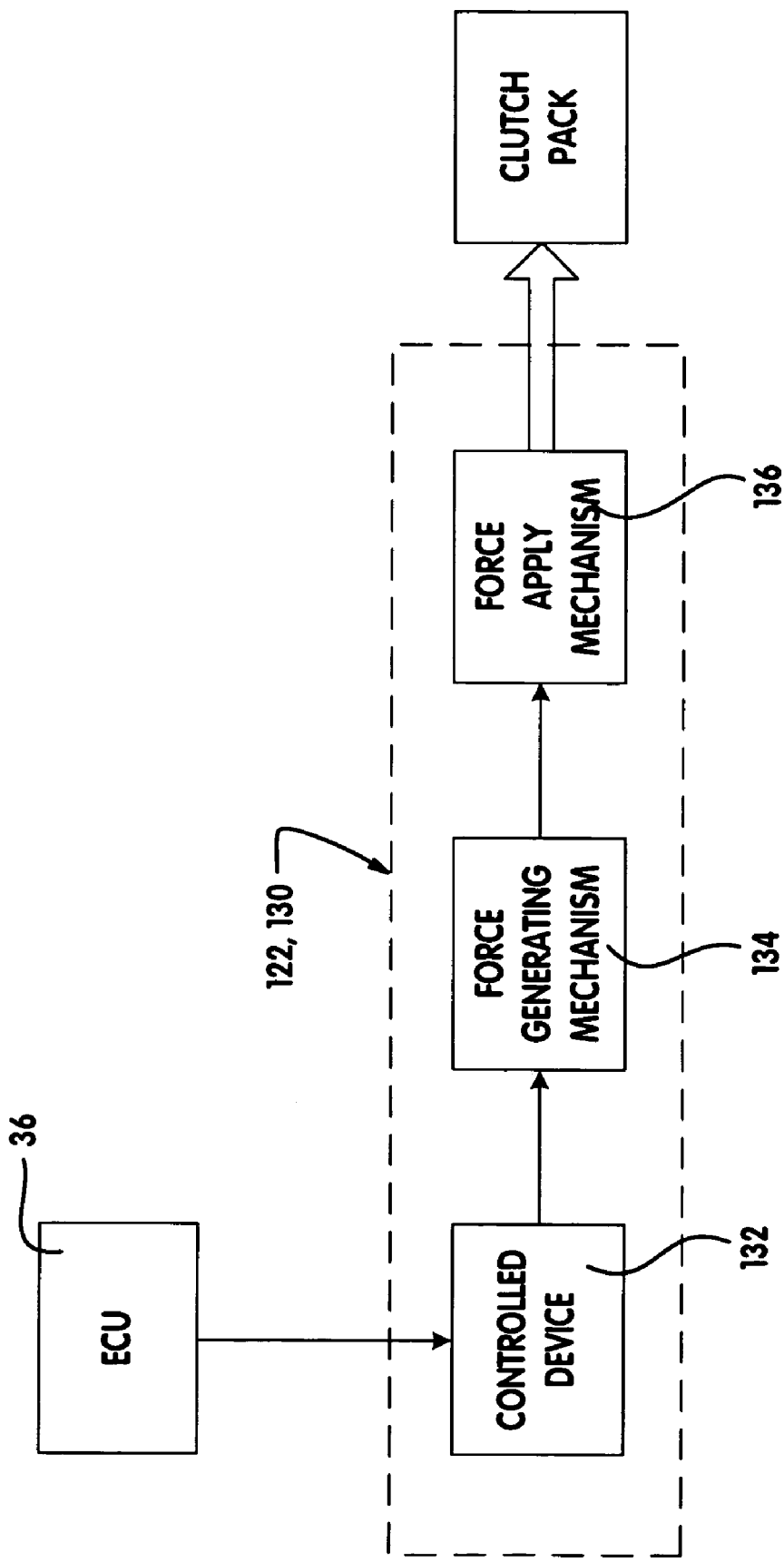
FIG. 4 is a diagrammatical illustration of a power-operated actuators associated with the drive units of the present invention.

As seen, power-operated clutch actuators 122 and 130 are shown in schematic fashion to cumulatively represent the components required to accept a control signal from ECU 36 and generate a clutch engagement force to be applied to its corresponding clutch pack. To this end, FIG. 4 diagrammatically illustrates the basic components associated with such power-operated clutch actuators. Specifically, each power-operated actuator includes a controlled device 132, a force generating mechanism 134, and a force apply mechanism 136. In electro-mechanical systems, controlled device 132 would represent such components as, for example, an electric motor or an electromagnetic solenoid assembly capable of receiving an electric control signal from ECU 36. The output of controlled device 100 would drive a force generating mechanism 102 comprised of, for example, a ball ramp, a ball screw, a leadscrew, a pivotal lever arm, cam plates, etc., capable of converting the output into a clutch engagement force. Finally, force apply mechanism 104 functions to transmit and exert the clutch engagement force generated by force generating mechanism 102 onto the clutch pack and can include, for example, an apply plate or a thrust plate. If a hydra-mechanical system is used, controlled device 100 would be a flow or pressure control valve operable for delivering pressurized fluid from a fluid source to a piston chamber. A piston disposed for movement in the piston chamber would act as force generating mechanism 102. Preferably, controlled device 100 is also capable of receiving variable electric control signals from ECU 36 for permitting modulation of the magnitude of the clutch engagement force generated and applied to the clutch packs so as to permit "adaptive" control of the mode clutches.

In accordance with the arrangement shown, drive mechanism 28 is operable in coordination with yaw control system 34 to establish at a least four distinct operational modes for controlling the transfer of drive torque from input shaft 54 to axleshafts 30L and 30R. In particular, a first operational mode is established when first mode clutch 60 and second mode clutch 62 are both in their released mode such that differential assembly 56 acts as an "open" differential so as to permit unrestricted speed differentiation with drive torque transmitted from differential carrier 68 to each axleshaft 30L, 30R based on the tractive conditions at each corresponding rear wheel 32L, 32R. A second operational mode is established when both first mode clutch 60 and second mode clutch 62 are in their locked mode such that differential assembly 56 acts as a "locked" differential with no speed differentiation permitted between rear axleshafts 30L, 30R. This mode can be intentionally selected via actuation of lock switch 50 when vehicle 10 is being operated off-road or on poor roads.

A third operational mode is established when first mode clutch 60 is shifted into its locked mode while second mode clutch 62 is operable in its released mode. With first sun gear 84 held against rotation, rotation of first planet carrier 96 due to driven rotation of differential carrier 68 causes first ring gear 86 to be driven at an increased speed relative to differential carrier 68. As a result, right axleshaft 30R is overdriven at the same increased speed of first ring gear 86 due to its connection thereto via second drum 116 and second planet carrier 112. Such an increase in speed in right axleshaft 30R causes a corresponding speed reduction in left axleshaft 30L. Thus, left axleshaft 30L is underdriven while right axleshaft 30R is overdriven to accommodate the current tractive or steering condition detected and/or anticipated by ECU 36 based on the particular control strategy used.

A fourth operational mode is established when first mode clutch 60 is shifted into its released mode and second mode clutch 62 is shifted into its locked mode. With second sun gear 100 held against rotation and second ring gear 102 driven at a common speed with differential carrier 68, second planet carrier 112 is driven at a reduced speed. As a result, right rear axleshaft 30R is underdriven relative to differential carrier 68 which, in turn, causes left axleshaft 30L to be overdriven at a corresponding increased speed. Thus, left axleshaft 30L is overdriven while right axleshaft 30R is underdriven to accommodate the current tractive or steering conditions detected and/or anticipated by ECU 36.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58.

Typically, mode clutches 60 and 62 would be non-engaged such that drive torque is transmitted through differential unit 56 to rear wheels 32L and 32R. However, upon detection of lost traction at front wheels 20L and 20R, one or both mode clutches 60 and 62 can be engaged to provide drive torque to rear wheels 32L and 32R based on the tractive needs of the vehicles.

In addition to on-off control of the mode clutches to establish the various drive modes associated with direct or underdrive connections through the planetary gearsets, it is further contemplated that variable clutch engagement forces can be generated by the power-operated actuators to adaptively control left-to-right speed and torque characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of the mode clutches also permits adaptive regulation of the side-to-side torque and speed characteristics if one of the distinct drive modes is not adequate to accommodate the current steer tractive condition.

Figure 5:
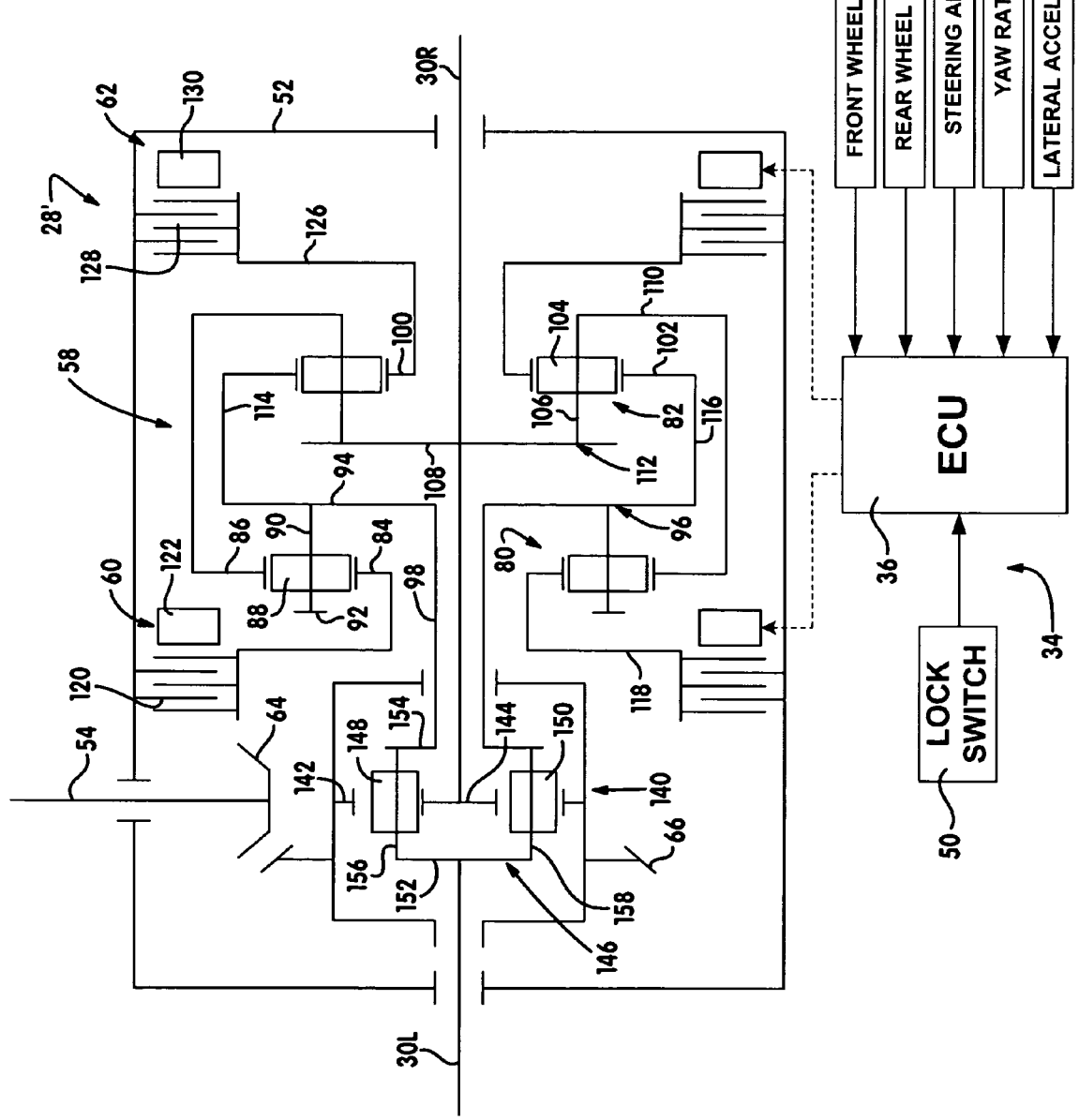
FIG. 5 is a schematic illustration of an alternative embodiment of the drive axle assembly of the present invention.

Referring now to FIG. 5, an alternative embodiment of drive mechanism 28 of FIG. 2 is shown and designated by reference numeral 28'. Generally speaking, a large number of components are common to both drive mechanism 28 and 28', with such components being identified by the same reference numbers. However, drive mechanism 28' is shown to include a modified differential assembly 140 of the planetary type having a ring gear 142 driven by hypoid ring gear 68 so as to act as its input component. Differential assembly 140 further includes a sun gear 144 fixed for common rotation with right axleshaft 30R, a differential carrier 146 fixed for common rotation with left axleshaft 30L, and meshed sets of first pinions 148 and second pinions 150. Planet carrier 146 includes a first carrier ring 152 fixed to left axleshaft 30L, a second carrier ring 154 fixed to quill shaft 98, a set of first pins 156 extending between the carrier rings and on which first pinions 148 are rotatably supported, and a set of second pins 158 also extending between the carrier rings and rotatably supporting second pinions 150 thereon. First pinions 148 are meshed with sun gear 144 while second pinions 150 are meshed with ring gear 142. As seen, quill shaft 98 connects differential carrier 146 for common rotation with planet carrier 96 of first gearset 80.

Drive mechanism 28' is similar in operation to drive mechanism 28 in that first mode clutch 60 functions to cause right axleshaft 30R to be overdriven while second mode clutch 62 functions to cause right axleshaft 30R to be underdriven. As such, the four distinct operational modes previously described are again available and can be established by drive mechanism 28' via selective actuation of power-operated clutch actuators 122 and 130.

Figure 6:
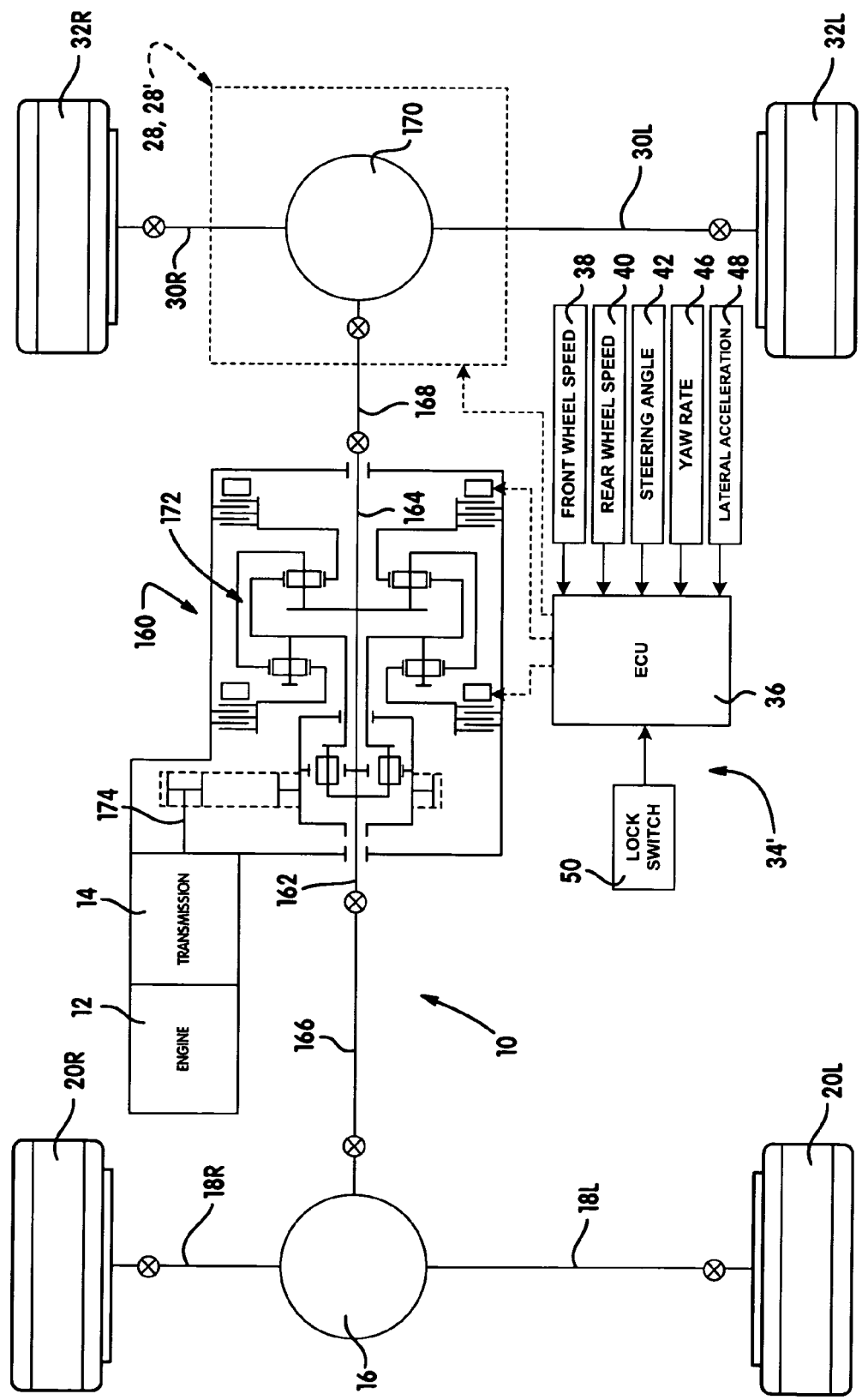
FIG. 6 is a diagrammatical illustration of the torque distributing differential assembly of the present invention installed in a power transfer unit for use in a four-wheel drive vehicle.

Referring now to FIG. 6, a four-wheel drive vehicle 10' is shown with a power transfer unit 160 operable for transferring drive torque from the output of transmission 14 to a first (i.e., front) output shaft 162 and a second (i.e., rear) output shaft 164. Front output shaft 162 drives a front propshaft 166 which, in turn, drives front differential 16 for driving front wheels 20L and 20R. Likewise, rear output shaft 164 drives a rear propshaft 168 which, in turn, drives a rear differential 170 for driving rear wheels 32L and 32R. Power transfer unit 160, otherwise known as a transfer case, includes a torque distribution mechanism 172 which functions to transmit drive torque from its input shaft 174 to both of output shafts 162 and 164 so as to bias the torque distribution ratio therebetween, thereby controlling the tractive operation of vehicle 10'. As seen, torque distribution mechanism 172 is operably associated with a traction control system 34' for providing this adaptive traction control feature.

Referring primarily to FIG. 7, torque distribution mechanism 172 of power transfer unit 160 is shown to be generally similar in structure to drive mechanism 28' of FIG. 5 with the exception that ring gear 142 is now drivingly connected to input shaft 174 via a transfer assembly 180. In the arrangement shown, transfer assembly 180 includes a first sprocket 182 driven by input shaft 174, a second sprocket 184 driving ring gear 142, and a power chain 186 therebetween. As seen, front output shaft 162 is driven by differential carrier 146 of differential unit 140 which now acts as a center or "interaxle" differential for permitting speed differentiation between the front and rear output shafts. In addition, sun gear 144 of differential unit 140 drives rear output shaft 64. Also, planet carrier 112 of second gearset 82 is coupled to rear output shaft 164. Thus, control over actuation of mode clutches 60 and 62 results in corresponding increases or decreases in the rotary speed of rear output shaft 164 relative to front output shaft 162, thereby controlling the amount of drive torque transmitted therebetween. In particular, with both mode clutches released, unrestricted speed differentiation is permitted between the output shafts while the gear ratio established by the components of interaxle differential unit 140 controls the front-to-rear torque ratio based on the current tractive conditions of the front and rear wheels. In contrast, with both mode clutches engaged, a locked four-wheel drive mode is established wherein no interaxle speed differentiation is permitted between the front and rear output shafts. Such a drive mode can be intentionally selected via lock switch 50 when vehicle 10' is driven off-road or during severe road conditions. An adaptive four-wheel drive mode is made available under control of traction control system 34' to vary the front-rear drive torque distribution ratio based on the tractive needs of the front and rear wheels as detected by the various sensors. In addition to power transfer unit 160, vehicle 10' could also be equipped with a rear axle assembly having either drive mechanism 28 or 28' and its corresponding yaw control system, as is identified by the phantom lines in FIG. 6.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism coupling said input shaft to said first and second axleshafts, said drive mechanism including a differential assembly, a planetary gear assembly, and first and second mode clutches, said differential assembly having an input component driven by said input shaft, a first output component driving said first axleshaft and a second output component driving said second axleshaft, said planetary gear assembly having first and second gearsets, said first gearset having a first sun gear, a first ring gear, a first planet carrier driven by said input component, and a set of first planet gears rotatably supported by said first planet carrier and meshed with said first sun gear and said first ring gear, said second gearset having a second sun gear, a second ring gear driven by said first planet carrier, a second planet carrier driven by said first axleshaft, and a set of second planet gears rotatably supported by said second planet carrier and meshed with said second sun gear and said second ring gear, said first mode clutch is operable for selectively inhibiting rotation of said first sun gear so as to cause said planetary gear assembly to decrease the rotary speed of said first axleshaft, and said second mode clutch is operable for selectively inhibiting rotation of said second sun gear so as to cause said planetary gear assembly to increase the rotary speed of said first axleshaft; and
a control system for controlling actuation of said first and second mode clutches.

2. The motor vehicle of claim 1 wherein said input shaft includes a pinion gear driving a hypoid ring gear, and wherein said differential assembly includes a differential carrier connected to said first planet carrier and driven by said hypoid ring gear, a first sidegear fixed for rotation with said first axleshaft, a second sidegear fixed for rotation with said second axleshaft, and pinion gears rotatably supported by said differential carrier and in meshed engagement with both of said first and second sidegears.

3. The motor vehicle of claim 1 wherein said input shaft includes a pinion gear driving a hypoid ring gear, and wherein said differential assembly includes a third ring gear driven by said hypoid ring gear, a third sun gear fixed for rotation with said first axleshaft, a differential carrier connected to said first planet carrier and fixed for rotation with said second axleshaft, a set of first pinions supported by said differential carrier and meshed with said third ring gear, and a set of second pinions supported by said differential carrier and meshed with said third sun gear, said first and second pinions arranged in meshed pairs.

4. The motor vehicle of claim 1 wherein said drive mechanism is operable to establish a locked mode when both of said first and second mode clutches are engaged.

5. The motor vehicle of claim 1 wherein said drive mechanism is operable to establish an overdrive mode when said first mode clutch is engaged and said second mode clutch is released such that said first axleshaft is overdriven relative to said input component of said differential assembly for causing said second axleshaft to be driven at a reduced speed relative to said first axleshaft.

6. The motor vehicle of claim 5 wherein said drive mechanism is operable to establish an underdrive mode when said second mode clutch is engaged and said first mode clutch is released such that said first axleshaft is underdriven relative to said input component of said differential assembly for causing said second axleshaft to be driven at an increased speed relative to said first axleshaft.

7. A drive axle assembly for use in a motor vehicle having a powertrain and first and second wheels, comprising:
- an input shaft driven by the powertrain;
- a first axleshaft driving the first wheel;
- a second axleshaft driving the second wheel;
- a differential assembly having a pinion carrier driven by said input shaft and supporting pinions thereon, a first sidegear meshed with said pinions and fixed for rotation with said first axleshaft, and a second sidegear meshed with said pinions and fixed for rotation with said second axleshaft;
- a first gearset having a first sun gear, a first ring gear, a first planet carrier fixed for rotation with said pinion carrier, and first planet gears rotatably supported by said first planet carrier and meshed with said first sun gear and said first ring gear;
- a second gearset having a second sun gear, a second ring gear fixed for rotation with said first planet carrier, a second planet carrier fixed for rotation with said first axleshaft, and second planet gears rotatably supported by said second planet carrier and meshed with said second sun gear and said second ring gear;
- a first mode clutch for selectively inhibiting rotation of said first sun gear;
- a second mode clutch for selectively inhibiting rotation of said second sun gear; and
- a control system for controlling actuation of said first and second mode clutches.

8. The drive axle assembly of claim 7 wherein said first mode clutch is operable in a first mode to permit unrestricted rotation of said first sun gear and in a second mode to prevent rotation of said first sun gear, wherein said second mode clutch is operable in a first mode to permit unrestricted rotation of said second sun gear and in a second mode to prevent rotation of said second sun gear, and wherein said control system is operable for controlling shifting of each of said first and second mode clutches between its corresponding first and second modes.

9. The drive axle assembly of claim 8 wherein an overdrive mode is established when said first mode clutch is in its second mode and said second mode clutch is in its first mode such that said first axleshaft is driven at an increased rotary speed relative to said pinion carrier which causes said pinions to drive said second axleshaft at a corresponding decreased rotary speed relative to said pinion carrier.

10. The drive axle assembly of claim 8 wherein an underdrive mode is established when said first mode clutch is in its first mode and said second mode clutch is in its second mode such that said first axleshaft is driven at a reduced rotary speed relative to said pinion carrier which causes said pinions to drive said second axleshaft at a corresponding increased rotary speed.

* * * * *